Patented Apr. 15, 1924.

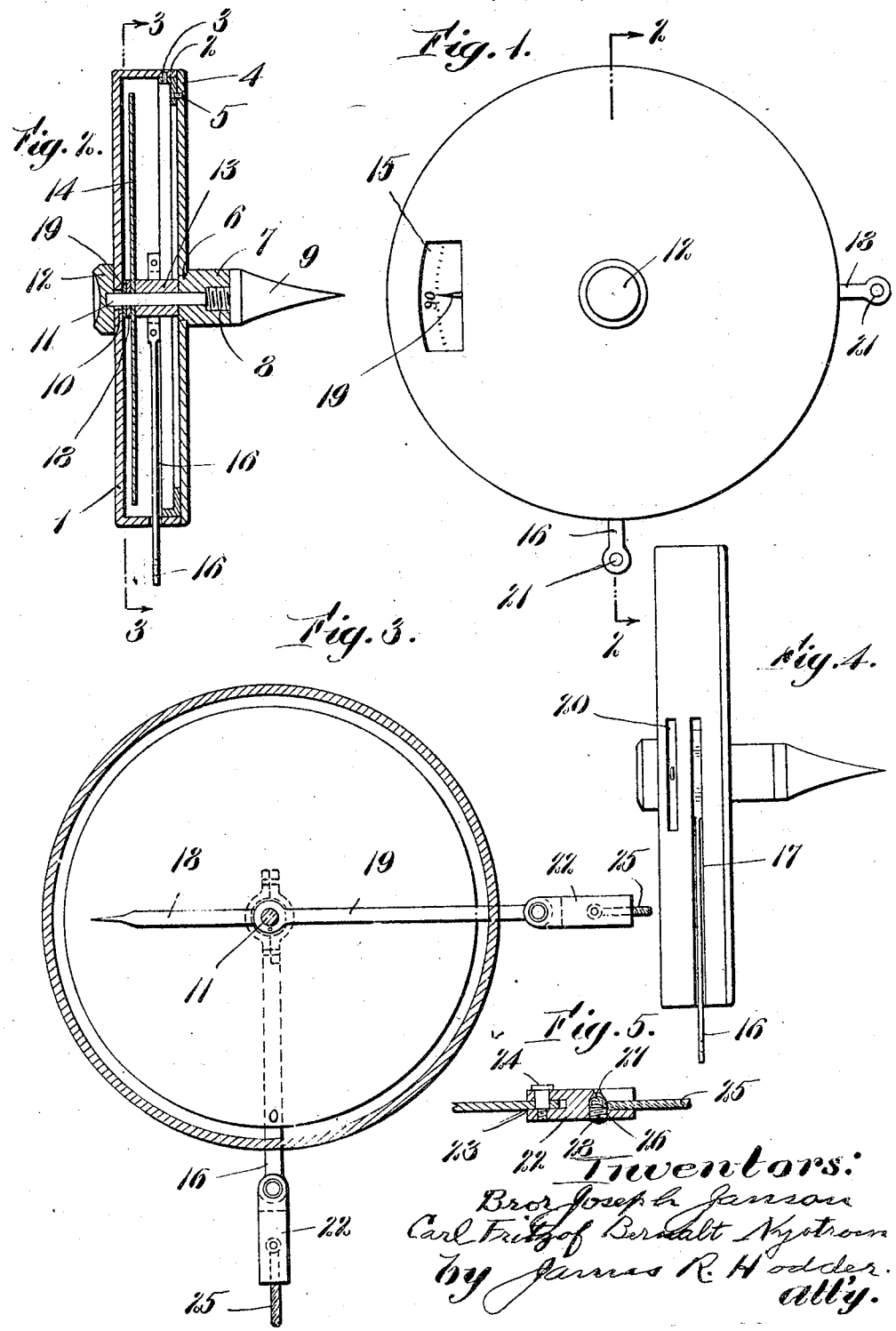

1,490,111

UNITED STATES PATENT OFFICE.

BROR JOSEPH JANSON AND CARL FRITJOF BERNALT NYSTROM, OF CAMBRIDGE, MASSACHUSETTS.

MEASURING INSTRUMENT.

Application filed November 5, 1920. Serial No. 421,937.

*To all whom it may concern:*

Be it known that we, BROR JOSEPH JANSON, a subject of the King of Sweden, and resident of Cambridge, in the county of Middlesex and State of Massachusetts, and CARL FRITJOF BERNALT NYSTROM, a citizen of the United States, and resident of Cambridge, in the county of Middlesex and State of Massachusetts, have invented an Improvement in Measuring Instruments, of which the following description, in connection with the accompanying drawings, is a specification, like letters on the drawings representing like parts.

Our present invention relates to measuring instruments and more particularly to a squaring head or protractor for laying off angles.

In laying off angles in constructional work, such for example as squaring up the walls of a building during construction, it has heretofore been the custom to square the walls by measuring various distances from the intersection of two walls and by a process of computation, determining whether or not the walls are at right angles with each other. As the computations to be made are necessarily intricate in character and as the workman who is usually performing such computations is not a skilled mathematician the chances for error are exceedingly great. The only other method than that above referred to is for the builders to employ a surveyor who must use his surveying instruments to perform the necessary work required. As far as we are aware, no instrument capable of successfully performing the operations referred to, is available and certainly no instrument is at the present obtainable at a reasonable cost that will successfully perform this work.

With a view to obviating the objections noted above and the further view to placing in the hands of builders and contractors an instrument that will be simple in construction, efficient in operation, and capable of being readily and accurately manipulated by workmen of ordinary intelligence, we have devised the subject-matter of the present application.

The principal object of the present invention, therefore, is the provision of a simple and accurate measuring or angle indicating instrument.

Other objects and novel features of construction and arrangement of the various elements comprising the instrument will appear as the description of the invention progresses.

In the accompanying drawing, illustrating the preferred embodiment of our invention, Fig. 1 is a plan view;

Fig. 2 is a cross-sectional side elevation on the line 2—2 of Fig. 1;

Fig. 3 is a sectional view on the line 3—3 of Fig. 2;

Fig. 4 is a side elevation; and

Fig. 5 is a detail showing the construction of the cord attaching device.

Referring to the drawing, 1 designates the case, preferably made of stamped or spun sheet metal, to the outer or open end of which is fastened an annular ring 2, this ring being fastened to the casing in any suitable manner, as by rivets 3. Secured to the annular ring 3 is a plate 4, this plate being of the same diameter as the diameter of the case 1 and attached to the annular ring 2 preferably by rivets 5. Attached to the plate 4 through a centrally located orifice 6 therein, is a stud or bearing member 7 drilled and tapped at its outer end as shown at 8 to receive the threaded end of the pointed member 9. The bearing member 7 may be either a drive fit in the hole 6 in the plate 4 or attached thereto in any other suitable manner, as by soldering, or brazing. The flat face of the casing 1 is provided with a perforation 10, through which passes a shaft 11, securely fastened at its outer end to a button 12. This shaft 11 is rotatably mounted in the bearing member 7, the bearing member being bored for this purpose.

This construction allows the pointed member to be placed in position at any desired point and the entire instrument pressed downwardly by pressing on the button 12. Rotatably mounted on the intermediate portion of the shaft 11 is a collar or hub 13 to the top of which is attached a graduated protractor disc 14, this protractor disc being graduated on its upper face in degees or fractions thereof on either side of the zero mark up to and including ninety degrees, the graduated portion of the protractor disc being visible through a window or sight 15 in the flat face of the case 1, as clearly shown in Fig. 1.

Atttached to the collar or hub 13 in any suitable manner, as by the split end construction shown in Figs 2 and 3, is a protractor link 16, which extends through an elongated slot 17 in the case 1 and parallel to the flat face of such case. This slot 17 is of sufficient length to allow the link 16 to be moved through an angle slightly greater than two hundred and ten degrees. Rotatably mounted on the shaft 11 between the inner face of the case 1 and the protractor 14, is a member 18, having attached thereto and in alinement therewith, an indicating hand 19, the indicating hand registering with the graduations on the protractor 14. One end of this member 18 extends through a slot 20 in the case 1 parallel to the slot 17, this slot 20, however, only being of such a length as to allow the member 18 to swing through an angle of approximately twenty to thirty degrees. The ends of the link 16 and member 18 are provided with eyes 21 to which may be pivotally mounted a coupling 22 for cord or other suitable measuring means. This coupling comprises a body member having a slot 23 at one end through which passes the stud 24 that registers with the eye 21 in the link 16 and member 18. The other end of the body member is provided with a hole in alinement with the length of the body and of sufficient diameter to receive the cord 25. Intermediate the ends of the body is a threaded hole 26 that intersects the hole for the cord 25 and this hole 26 is of such a diameter as to receive the knot 27 on the end of the cord 25. A screw 28 retains the end of the cord in position.

The operation of our improved device is as follows:

Assuming that it is desired to lay off from a corner post of a building to be constructed, guiding lines for two walls at right angles to each other, the end of the pointed member 8 is placed at the desired measuring point and the instrument held in position by means of the button 12; a workman will take one of the cords 25 attached to the end of the member 18, moving away from said instrument a sufficient distance, and the entire instrument is rotated by hand until the indicator 19 registers with the zero mark on the protractor 14. The entire instrument is now securely held in position, when another workman taking the cord 25 attached to the end of the link 16 moves the desired distance away from the instrument and walking either to the right or left as directed by the person holding the instrument, rotates the hub 13 with the protractor attached, until the desired angle, say ninety degrees, registers with the end of the indicator 19.

While we have necessarily described the preferred embodiment of our invention somewhat in detail, it is to be understood that the shape, size and arrangement of elements constituting the instrument may be varied within considerably wide limits without departing from the spirit of our invention.

Our invention is further described and defined in the form of claims as follows:

1. In a measuring instrument, the combination of an enclosing case, a cover therefor provided with a sight, a central shaft mounted in said enclosing case, a rotatable hub mounted on said shaft and carrying a protractor, and an indicating hand rotatably mounted on said shaft and visible through said sight, said protractor and indicating hand movable relatively to each other.

2. In a measuring instrument, the combination of an enclosing case provided with a sight, a shaft centrally mounted in said case, a protractor and an indicating hand rotatably mounted on said shaft and visible through said sight and said members movable relatively to each other.

3. In a measuring instrument, the combination of an enclosing case provided with a sight, a shaft centrally mounted in said enclosing case, a hub rotatably mounted on said shaft, a protractor attached to and rotatable with the hub and having its graduations visible through said sight, a member attached to the hub and having one end extending beyond the limits of the enclosing case, an indicator rotatably mounted on said shaft and registering with the graduations on the protractor, a link attached to and in alinement with the indicator and having one end extending beyond the limits of the enclosing case, the ends of said member and link being movable relatively to each other, whereby the angle between said member and link is indicated on the protractor.

In testimony whereof, we have signed our names to this specification.

BROR JOSEPH JANSON.
CARL FRITJOF BERNALT NYSTROM.